(12) United States Patent
Kinme et al.

(10) Patent No.: US 7,488,134 B2
(45) Date of Patent: Feb. 10, 2009

(54) COUPLING STRUCTURE OF SHAFT BODY AND SHAFT JOINT

(75) Inventors: Shigetaka Kinme, Kashihara (JP); Kenichi Aota, Nara (JP); Tadakatsu Take, Ebina (JP)

(73) Assignees: JTEKT Corporation, Osaka (JP); Nissan Motor., Co. Ltd., Kanagawa (JP)

( * ) Notice: Subject to any disclaimer, the term of this patent is extended or adjusted under 35 U.S.C. 154(b) by 0 days.

(21) Appl. No.: 10/800,082

(22) Filed: Mar. 8, 2004

(65) Prior Publication Data

US 2004/0185947 A1    Sep. 23, 2004

(30) Foreign Application Priority Data

Mar. 17, 2003    (JP) .............................. 2003-072008

(51) Int. Cl.
F16D 3/26    (2006.01)
F16D 1/04    (2006.01)
F16D 1/08    (2006.01)

(52) U.S. Cl. ..................... 403/12; 403/155; 403/398; 464/182; 464/901

(58) Field of Classification Search ................ 403/12, 403/155, 290, 373, 398; 464/134, 901
See application file for complete search history.

(56) References Cited

U.S. PATENT DOCUMENTS

| 4,504,164 | A | * | 3/1985 | Bien ........................... 403/330 |
| 5,358,350 | A | * | 10/1994 | Oertle .......................... 403/12 |
| 5,628,578 | A | * | 5/1997 | McClanahan et al. ....... 403/290 |
| 5,647,686 | A | * | 7/1997 | Hancock et al. |
| 6,155,739 | A | * | 12/2000 | Sekine et al. ................. 403/12 |
| 6,443,650 | B2 | * | 9/2002 | Ikeda ........................... 403/12 |
| 6,474,898 | B1 | * | 11/2002 | Aota et al. .................... 403/12 |

(Continued)

FOREIGN PATENT DOCUMENTS

DE    88 14 897 U1    1/1989

(Continued)

OTHER PUBLICATIONS

Patent Abstracts of Japan, vol. 1997, No. 04, Apr. 30, 1997 & JP 08 326767 A (Nippon Seiko KK), Dec. 10, 1996.

(Continued)

*Primary Examiner*—Daniel P Stodola
*Assistant Examiner*—Ernesto Garcia
(74) *Attorney, Agent, or Firm*—Darby & Darby P.C.

(57) ABSTRACT

A shaft body has an engagement portion with a slip-off preventing groove, and a positioning recess extending from the engagement portion. A shaft joint having an engagement groove to be engaged with the engagement portion and a bore facing the engagement groove is provided with a flexible member which is provided on an outer side in a longitudinal direction of the engagement groove to be engaged with the positioning recess. When an insufficient amount of engagement prevents engagement in the correct position, the engagement portion contacts with the flexible member and prevents the shaft body from engaging with the shaft joint. When canceling the coupling for maintenance, etc., the engagement of the flexible member with the positioning recess is cancelled by deflecting the flexible member in a width direction of the engagement groove. Consequently, the shaft body can be easily pulled out in a longitudinal direction of the engagement groove.

3 Claims, 8 Drawing Sheets

U.S. PATENT DOCUMENTS

| | | | |
|---|---|---|---|
| 6,575,658 B2 * | 6/2003 | Daniel et al. | 403/316 |
| 7,179,009 B2 * | 2/2007 | Stimpfl et al. | 403/57 |
| 2004/0091308 A1 * | 5/2004 | Kinme et al. | |

FOREIGN PATENT DOCUMENTS

| | | | |
|---|---|---|---|
| DE | 3839325 A1 * | 5/1990 | |
| DE | 4013810 A1 * | 10/1991 | |
| DE | 4129042 A1 * | 3/1993 | |
| DE | 42 02 684 C1 | 7/1993 | |
| DE | 199 25 701 A1 | 12/1999 | |
| DE | 102 07 524 A1 | 9/2002 | |
| EP | 859160 A1 * | 8/1998 | |
| JP | 61-141818 U | 9/1986 | |
| JP | 6-201020 A | 7/1994 | |
| JP | 6-78630 U * | 11/1994 | |
| JP | 07-186977 A | 7/1995 | |
| JP | 08-326767 A | 12/1996 | |
| JP | 08338440 A * | 12/1996 | |
| JP | 2000-297823 A | 10/2000 | |
| JP | 2000-310232 A1 | 11/2000 | |
| JP | 2000-320562 A1 | 11/2000 | |
| JP | 2001099178 A * | 4/2001 | |
| JP | 2002039205 A * | 2/2002 | |

OTHER PUBLICATIONS

European Search Report.
Japanese Office Action mailed Jul. 29, 2008; Japanese Application No. 2003-072008; pp. 1-3.

* cited by examiner

COUPLING STRUCTURE OF SHAFT BODY AND SHAFT JOINT

BACKGROUND OF THE INVENTION

1. Field of the Invention

The present invention relates to a coupling structure of a shaft body and a shaft joint.

2. Description of Related Art

A steering apparatus for a vehicle comprises: a steering shaft with one end connected to a steering wheel; a transmission shaft having, on one end thereof, a shaft joint connected to the other end of the steering shaft; and a pinion shaft coupled to the other end of the transmission shaft through another shaft joint and having a pinion meshing with the mid portion of a rack shaft which extends in the left and right direction of the vehicle.

The coupling structure of a shaft joint and a shaft body composed of a steering shaft or a pinion shaft is disclosed, for example, in Japanese Patent Application Laid-Open No. 2000-310232.

According to the coupling structure of Japanese Patent Application Laid-Open No. 2000-310232, an end of the shaft body is provided with a non-circular engagement portion having a pair of parallel flat faces on a part of circular circumferential surface, and a slip-off preventing groove with both ends facing the flat faces. The shaft joint has an engagement groove with which the engagement portion is engaged so that relative rotation is impossible, two concentric bores facing the engagement groove, and a nut member press-fitted into one of the bores. In addition, held on the outer periphery of the shaft joint is a plate body comprising: a regulating tongue for regulating the movement of the shaft body within the engagement groove; and a supported portion connected to the regulating tongue through a substantially U-shaped curved portion and supported by the press-fitting of the nut member. Bores corresponding to the above-mentioned respective bores are formed in the supported portion and a position facing the supported portion.

The shaft body and the shaft joint are coupled up by: inserting the engagement portion of the shaft body into the engagement groove of the shaft joint from the edge side in the depth direction of the engagement groove to engage the engagement portion with the engagement groove; inserting a bolt into the bores of the plate body and the shaft joint and the slip-off preventing groove; and tightening the bolt into the nut member, so that relative movement in the axial direction of the engagement groove and relative rotation are impossible. In this case, with the insertion of the engagement portion into the engagement groove, the regulating tongue of the plate body is deflected, and, after the engagement portion is engaged with the engagement groove, the regulating tongue is elastically restored, comes into contact with a side face of the engagement portion, and regulates the W movement of the engagement portion in a direction opposite to the insertion direction.

In the coupling structure constructed as described above, however, it is possible to insert the engagement portion of the shaft body into the engagement groove even when the shaft body is not engaged in the correct position of the engagement groove. Moreover, it is also possible to insert the bolt into the bores of the shaft joint and tighten the bolt even when the shaft body is not engaged in the correct position due to an insufficient amount of engagement. Therefore, there is a possibility that the shaft body and the shaft joint cannot be securely coupled. For example, even in a state in which the engagement amount is insufficient because the engagement portion of the shaft body is engaged at a position nearer to the longitudinal end of the engagement groove than the bores into which the bolt is inserted, it is possible to insert the bolt into the bores and tighten the bolt, however the shaft body is not securely coupled because the bolt is not inserted into the slip-off preventing groove of the shaft body. Accordingly, for example, when the above-mentioned coupling structure is adopted in a steering apparatus in which the space around the shaft joint is narrow and the process of coupling the shaft body and the shaft joint is performed in a state in which the coupling portion of the shaft body and the shaft joint cannot be seen directly, there is a possibility that the steering apparatus is mounted in the vehicle body in a state in which the shaft body is not engaged in the correct position due to the insufficient amount of engagement.

BRIEF SUMMARY OF THE INVENTION

The present invention has been made with the aim of solving the above problems, and it is an object thereof to provide a coupling structure of a shaft body and a shaft joint, capable of preventing the shaft body from being inserted into an engagement groove in a state in which it is not engaged in the correct position and allowing the shaft body to be easily pulled out in a longitudinal direction of the engagement groove when canceling the coupling.

A coupling structure of a shaft body and a shaft joint according to the present invention is a coupling structure for coupling a shaft body and a shaft joint having an engagement groove with which the shaft body is engaged and bores facing the engagement groove by a coupling shaft inserted into the bores, characterized in that the shaft body has a positioning recess in the middle thereof in a longitudinal direction, and the shaft joint has a flexible member which is provided on an outer side in a longitudinal direction of the engagement groove and is to be engaged with the positioning recess. The flexible member may be provided more inwardly than a side face of the engagement groove.

In this coupling structure of a shaft body and a shaft joint, when the shaft body is inserted into the engagement groove in a state in which it is not engaged in the correct position due to an insufficient amount of engagement, a portion of the shaft body other than the positioning recess comes into contact with the flexible member, which should be engaged with the positioning recess, and generates a resistance against the insertion of the shaft body. It is therefore possible to judge that the shaft body is not engaged in the correct position due to an insufficient amount of engagement, and to avoid coupling in the state in which the shaft body is not engaged in the correct position due to an insufficient amount of engagement. On the other hand, in the case where the shaft body is inserted into the engagement groove correctly with a sufficient amount of engagement, since the flexible member is inserted into the positioning recess, it is possible to insert the shaft body into the engagement groove and to couple the shaft body and the shaft joint in a state in which the shaft body is engaged in the correct position with a sufficient amount of engagement. Besides, when canceling the coupling of the shaft body for maintenance, etc., the engagement of the flexible member with the positioning recess can be cancelled by deflecting the flexible member, and consequently, the shaft body can be easily pulled out in the longitudinal direction of the engagement groove.

The coupling structure of a shaft body and a shaft joint according to the present invention is characterized in that the flexible member has a deflection regulating portion facing a side face of the engagement groove.

In this coupling structure of a shaft body and a shaft joint, when the shaft body is inserted into the engagement groove in a state in which it is not engaged in the correct position due to an insufficient amount of engagement, a portion of the shaft body other than the positioning recess comes into contact with the flexible member, and the deflection regulating portion comes into contact with one side of the engagement groove with the application of force in a deflection direction to the flexible member, thereby regulating deflection of the flexible member. Accordingly, even when the operability of the flexible member is improved by increasing the flexibility of the flexible member, it is possible to prevent the shaft body from being inserted into the engagement groove in a state in which the shaft body is not engaged in the correct position due to an insufficient amount of engagement, and to more easily perform the process of canceling the coupling of the shaft body for maintenance, etc.

In the coupling structure of a shaft body and a shaft joint according to the present invention, the tip of the flexible member may be bent outward in a width direction of the engagement groove.

In this coupling structure of a shaft body and a shaft joint, it is possible to easily put a finger or the like on the tip of the flexible member. Therefore, when canceling the coupling of the shaft body for maintenance, etc., the shaft body can be more easily pulled out in the longitudinal direction of the engagement groove.

The above and further objects and features of the invention will more fully be apparent from the following detailed description with accompanying drawings.

DETAILED DESCRIPTION OF THE INVENTION

Figure 1:
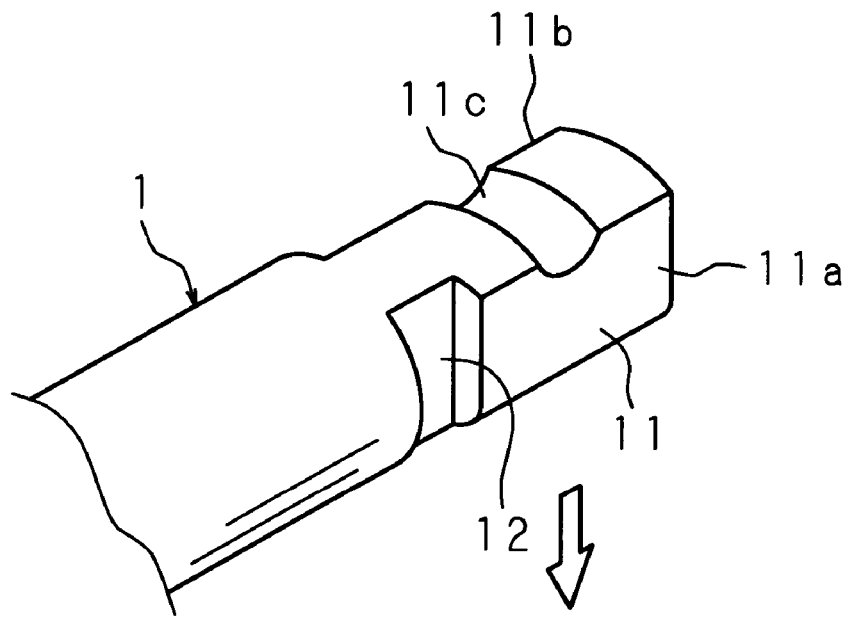
FIG. 1 is an exploded perspective view of a coupling structure according to the present invention.
Figure 1:
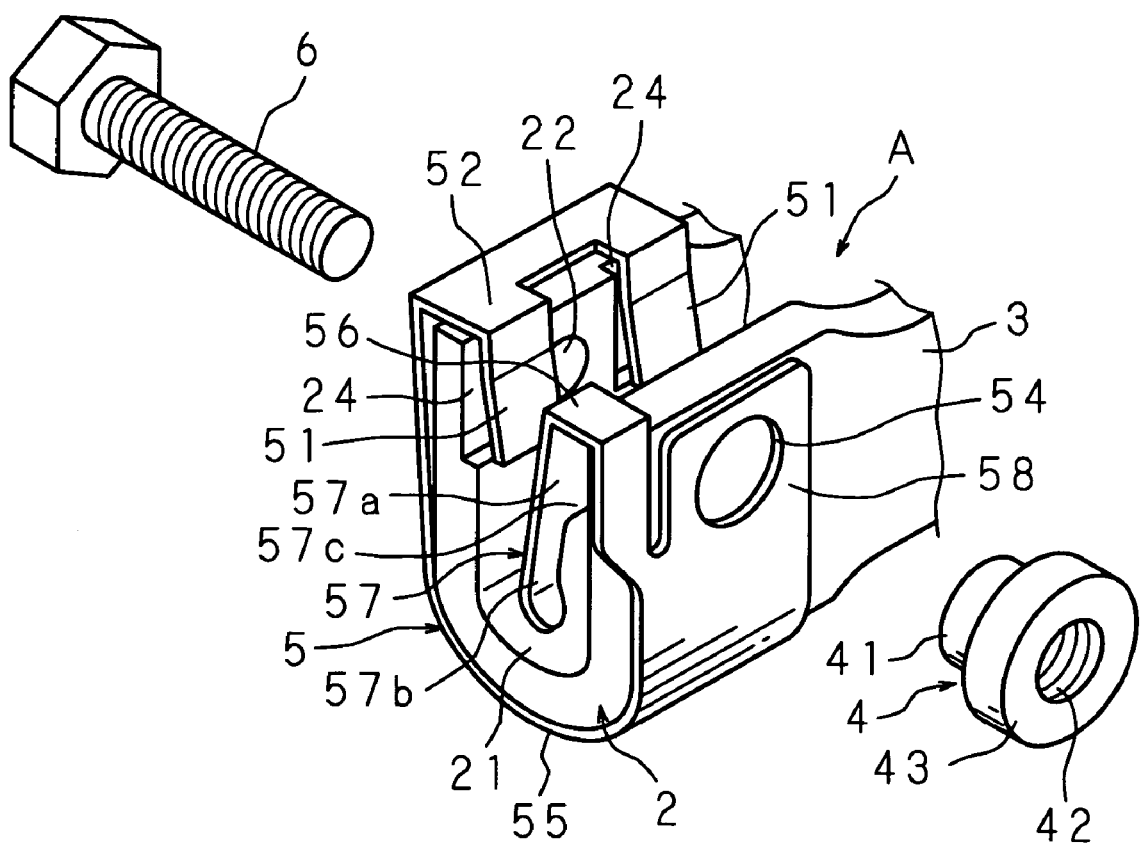
Figure 2:
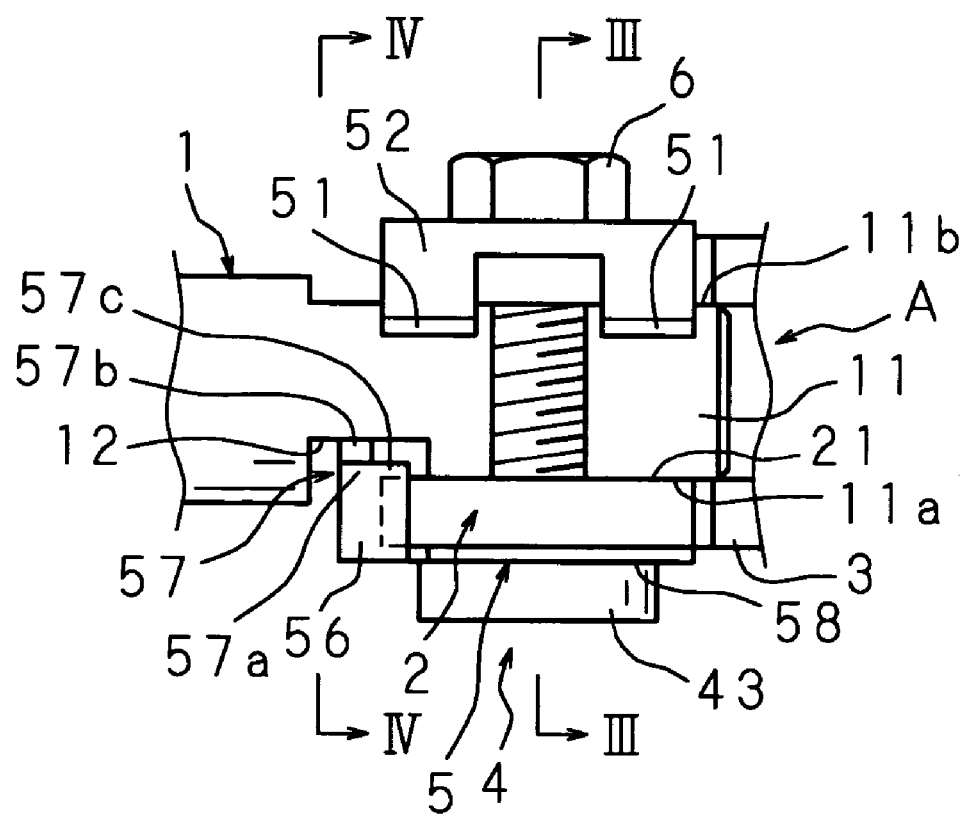
FIG. 2 is a plan view showing the coupling structure of the present invention.
Figure 3:
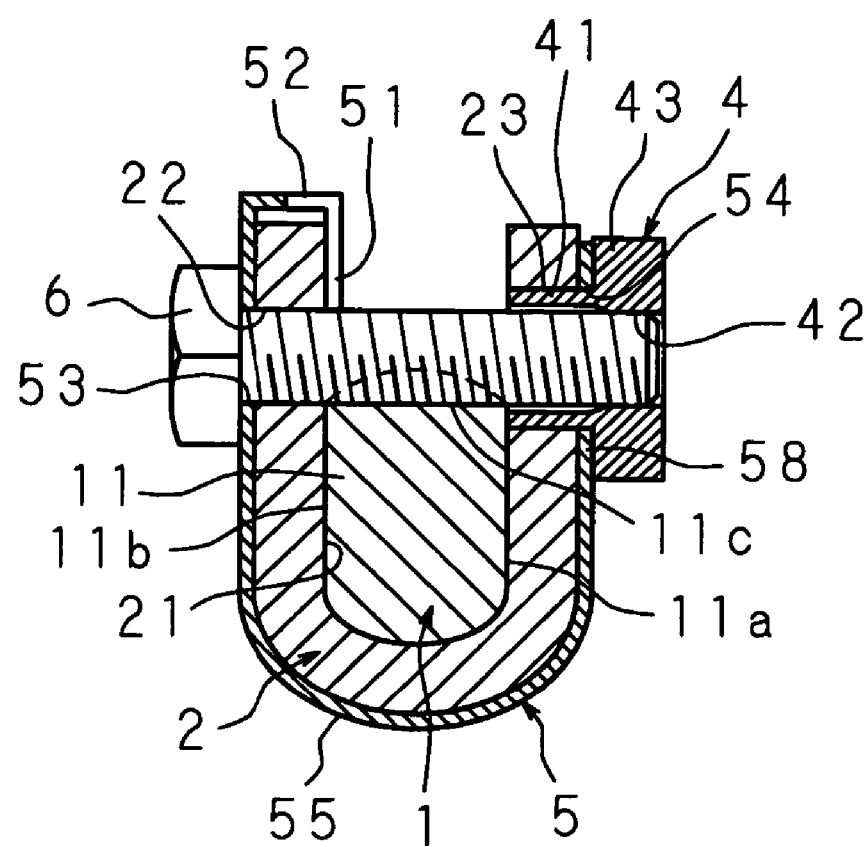
FIG. 3 is a cross sectional view along the III-III line in FIG. 2.
Figure 4:
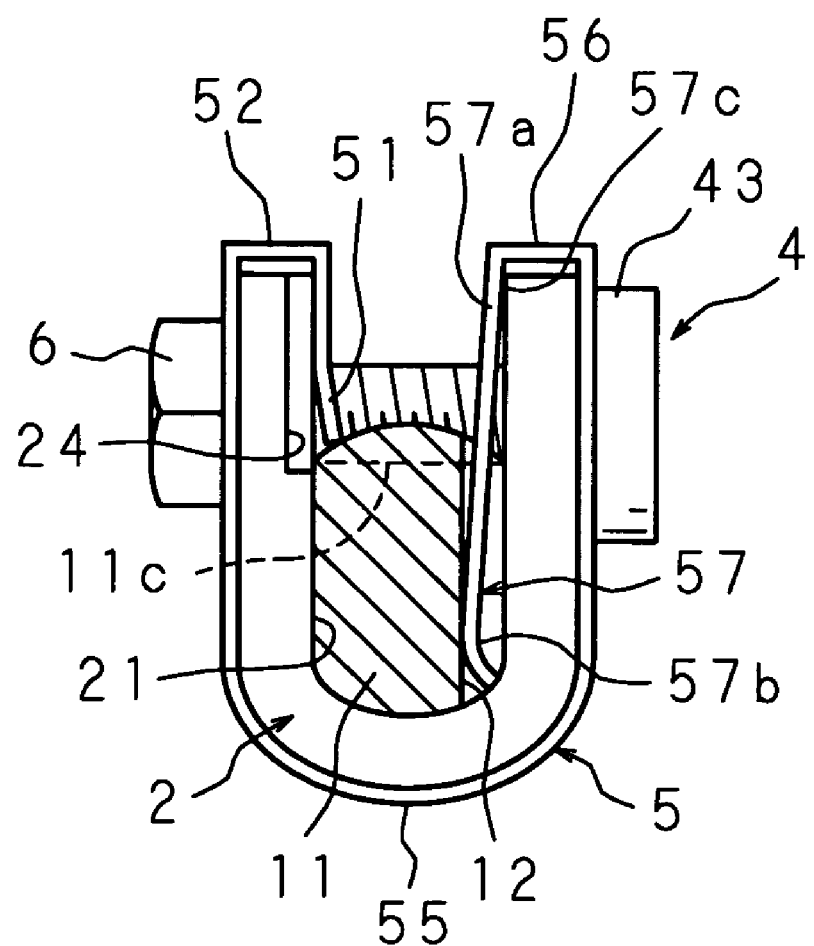
FIG. 4 is a cross sectional view along the IV-IV line in FIG. 2.

The following description will explain the present invention in detail, based on the drawings illustrating an embodiment thereof. FIG. 1 is an exploded perspective view of a coupling structure according to the present invention. FIG. 2 is a plan view. FIG. 3 is a cross sectional view along the III-III line in FIG. 2. FIG. 4 is a cross sectional view along the IV-IV line in FIG. 2.

This coupling structure is for coupling a shaft body 1 having a non-circular engagement portion 11 on one end thereof to a shaft joint A having an engagement groove 21 with which the engagement portion 11 is engaged so that relative rotation is impossible and two bores 22 and 23 facing the engagement groove 21, by a coupling shaft 6 inserted into the bores 22 and 23.

One end of the shaft body 1 has: a non-circular engagement portion 11 having a pair of parallel flat faces 11a and 11b on a part of circular circumferential surface and a semi-circular slip-off preventing groove 11c with both ends facing the flat faces 11a and 11b; and a positioning recess 12 extending from one flat face 11a of the engagement portion 11 and having a flat part which is caved in more deeply than the flat face 11a.

The shaft joint A comprises a joint portion 2 with a substantially U-shaped cross section having the engagement groove 21 with which the engagement portion 11 is engaged so that relative rotation is impossible and two concentric bores 22 and 23 facing the engagement groove 21; a yoke 3 extending from the joint portion 2 and having two concentric through bores (not shown); a locking body 4 press-fitted into the bore 23; and a plate body 5 held on the outer periphery of the joint portion 2 by the press-fitting of the locking body 4.

A side face of the engagement groove 21 of the joint portion 2 has one side face and the other side face being separated and facing each other, wherein two receiving recesses 24 which are caved in more deeply than the one side face are provided on the edge side in the depth direction in the one side face of the engagement groove 21.

The locking body 4 comprises a press-fit cylindrical portion 41, and an edge portion 43 extending from the press-fit cylindrical portion 41 and having a threaded hole 42. The press-fit cylindrical portion 41 is press-fitted into the bore 23, and the edge portion 43 projects from the joint portion 2 to the outside.

Figure 5:
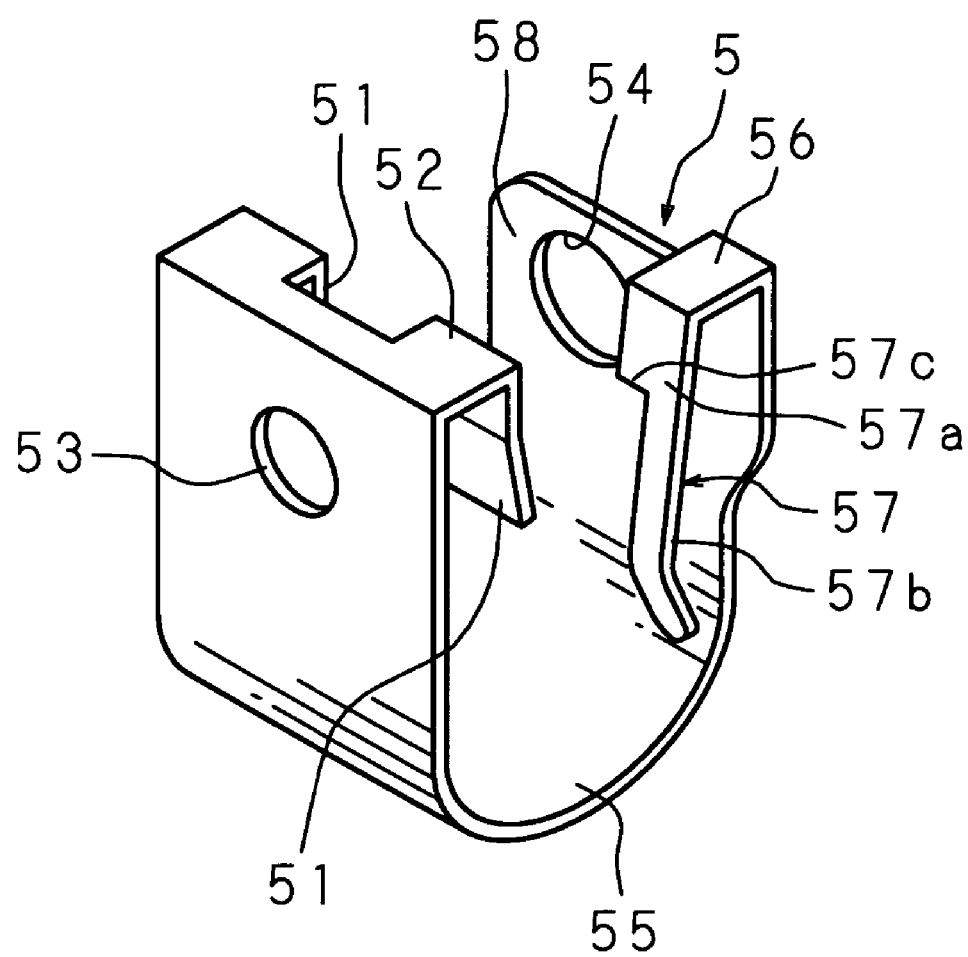
FIG. 5 is a perspective view of the plate body of the coupling structure of the present invention.

FIG. 5 is a perspective view of the plate body.

The plate body 5 is made of spring steel, and comprises: two regulating tongues 51 for regulating the movement of the shaft body 1 in the direction opposite to the insertion direction within the engagement groove 21; a substantially U-shaped curved portion 55 connected to the regulating tongues 51 through a bent portion 52 and having through bores 53 and 54 corresponding to the bores 22 and 23; and a flexible member 57 which is connected to the vicinity of one through bore 54 of the curved portion 55 through a bent portion 56, provided on an outer side in the longitudinal direction of the engagement portion 21 to engage with the positioning recess 12 of the shaft body 1, and deflectable in the width direction of the engagement groove 21.

The regulating tongues 51 are provided to regulate the movement of the shaft body 1 in the direction opposite to the insertion direction by contact of their ends with a part of the engagement portion 11 on the side opposite to the engagement direction. The regulating tongues 51 are apart from each other in the longitudinal direction of the engagement groove 21, face the receiving recesses 24, and are inclined toward the other end of the curved portion 55 from the middle to the tip.

The through bore 54 of the curved portion 55 is referred to as a supported portion 58 which is supported between the joint portion 2 and the edge portion 43 by the press-fitting of the press-fit cylindrical portion 41.

The flexible member 57 is provided to prevent engagement of the engagement portion 11 with the engagement groove 21 in a state where the engagement portion 11 is not engaged in the correct position of the engagement groove 21. The flexible member 57 comprises: a wide portion 57a extending from the bent portion 56; and a narrow portion 57b which is extending from the wide portion 57a and is narrower than the wide portion 57a. The narrow portion 57b is designed to deflect outwardly in the width direction of the engagement groove 21. The tip of the narrow portion 57b is bent outwardly in the width direction of the engagement groove 21 so that it is easy to put a finger or the like on the tip of the narrow portion 57b.

The flexible member 57 is provided more inwardly than the other side face of the engagement groove 21. In the case where the shaft body 1 is engaged with the engagement groove 21 in a state where the engagement portion 11 is not engaged in the correct position due to an insufficient amount of engagement, the engagement portion 11 comes into contact with the edge of the wide portion 57a, thereby preventing engagement of the engagement portion 11 with the engagement groove 21. On the other hand, when the engagement portion 11 is engaged in the correct position, the flexible member 57 is inserted into the positioning recess 12 and the narrow portion 57b is engaged with the positioning recess 12.

A part of the wide portion 57a serves as a deflection regulating portion 57c facing the other side face of the engagement groove 21. In the case where the engagement portion 11 is not engaged in the correct position due to an insufficient amount of engagement, if the engagement portion 11 comes into contact with the edge of the wide portion 57a, the deflection regulating portion 57c comes into contact with the other side face of the engagement groove. 21 and regulates the deflection of the flexible member 57. Besides, the wide portion 57a is located in a position where it does not come into contact with the engagement portion 11 when the engagement portion 11 is engaged with the engagement groove 21, and therefore the engagement portion 11 does not come into contact with the wide portion 57a when pulling out the shaft body 1 in the longitudinal direction of the engagement groove 21 by deflecting the narrow portion 57b and canceling the engagement of the narrow portion 57b with the positioning recess 12.

Figure 6:
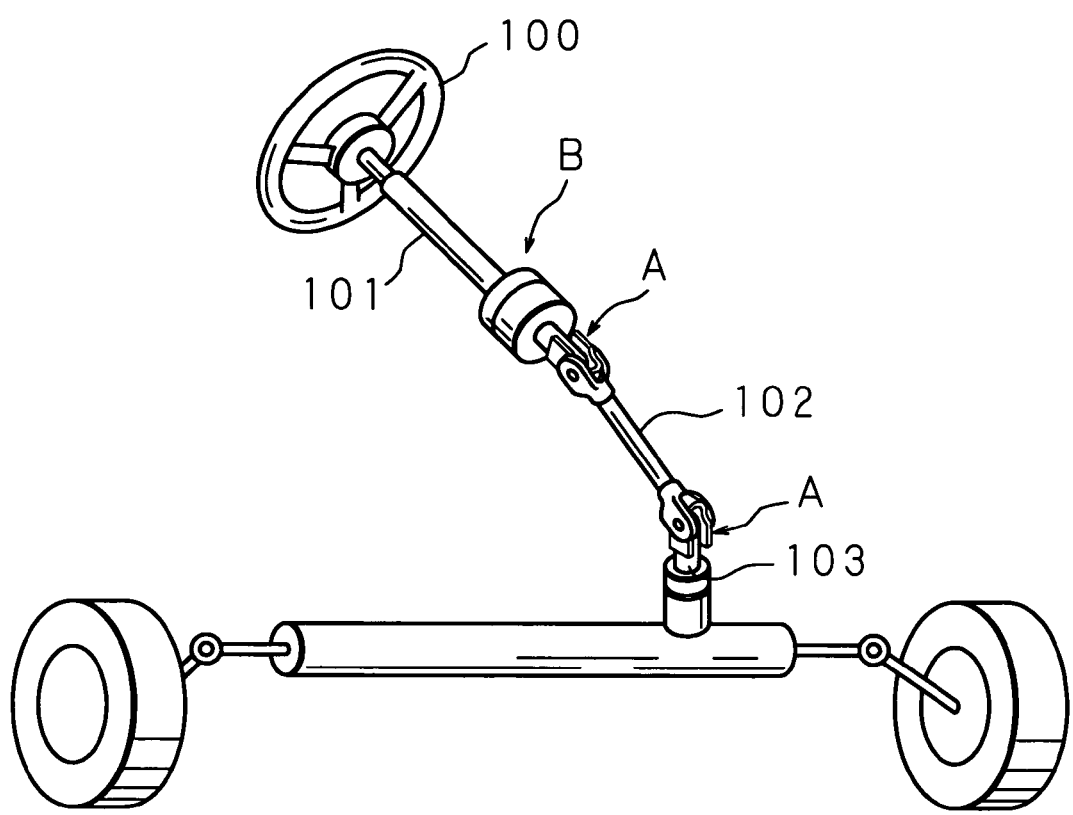
FIG. 6 is a schematic view showing an example of the coupling structure of the present invention applied to a steering apparatus.

FIG. 6 is a schematic view showing an example of the present invention applied to a steering apparatus.

The coupling structure constructed as described above is used, for example, in a steering apparatus B. This steering apparatus B comprises: a steering shaft 101 with one end connected to a steering wheel 100 for steering; a transmission shaft 102 with one end connected to the other end of the steering shaft 101 through a shaft joint A; and a pinion shaft 103 coupled to the other end of the transmission shaft 102 through another shaft joint A and having a pinion (not shown) meshing with the mid portion of a rack shaft (not shown) which extends in the left and right direction of a vehicle.

In the coupling structure constructed as described above, the engagement portion 11 of the shaft body 1 is inserted into the engagement groove 21 from the edge side in the depth direction of the engagement groove 21 and engaged. In the case where the engagement portion 11 is engaged in the correct position of the engagement groove 21, the positioning recess 12 faces the flexible member 57. In the case where the engagement portion 11 is not engaged in the correct position due to an insufficient amount of engagement between the engagement portion 11 and the engagement groove 21, the positioning recess 12 is apart from the flexible member 57 in the longitudinal direction of the engagement groove 21.

In the case where the engagement portion 11 is engaged in the correct position of the engagement groove 21, when the engagement portion 11 is inserted into the engagement groove 21, the regulating tongues 51 are deflected and drawn into the receiving recesses 24, and the narrow portion 57b of the flexible member 57 is inserted into the positioning recess 12, thereby permitting engagement of the engagement portion 11 with the engagement groove 21. With this engagement, the slip-off preventing groove 11c faces the bores 22 and 23. Consequently, by inserting the coupling shaft 6 configured as a bolt into the threaded hole 42 of the locking body 4 from the bore 22 and tightening the coupling shaft 6, the engagement portion 11 is fixed in the engagement groove 21. This fixing prevents relative rotation of the shaft body 1, and also prevents the shaft body 1 from being pulled out in the axial direction. Moreover, one side part of the curved portion 55 of the plate body 5 is pressed by the head of the coupling shaft 6, the regulating tongues 51 are displaced toward the inside of the engagement groove 21, and the tips of the regulating tongues 51 come into contact with a part of the engagement portion 11 on a side opposite to the insertion direction, thereby preventing the engagement portion 11 from swinging with the coupling shaft 6 as a fulcrum.

Figure 7:
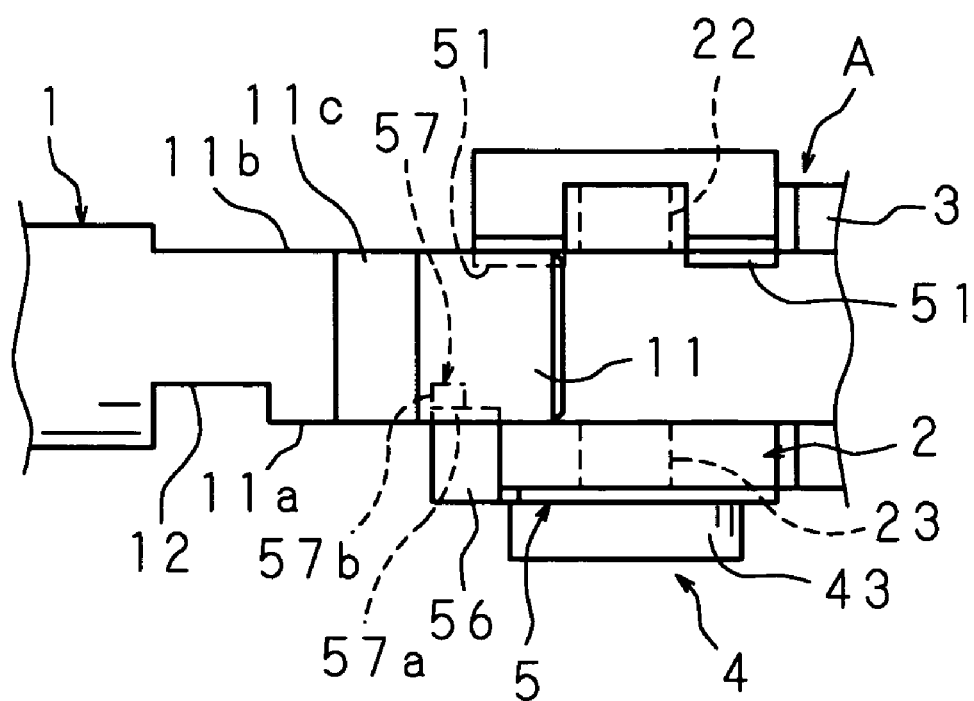
FIG. 7 is a view showing a state where the shaft body of the coupling structure of the present invention is not engaged in the correct position due to an insufficient amount of engagement between the shaft body and an engagement groove.

FIG. 7 is a view showing a state where the shaft body is not engaged in the correct position due to an insufficient amount of engagement between the shaft body and the engagement groove.

In the case where the positioning recess 12 is apart from the flexible member 57 in the longitudinal direction of the engagement groove 21 and the shaft body 1 is not engaged in the correct position due to an insufficient amount of engagement, the engagement portion 11 comes into contact with the edge of the wide portion 57a of the flexible member 57 and cannot be inserted into the engagement groove 21. It is therefore possible to judge that the shaft body 1 is not engaged in the correct position due to an insufficient amount of engagement, and to avoid coupling in the state in which the shaft body 1 is not engaged in the correct position due to the insufficient amount of engagement. Note that since the flexible member 57 has the deflection regulating portion 57c, when the engagement portion 11 comes into contact with the edge of the wide portion 57a, the deflection regulating portion 57c comes into contact with the other side face of the engagement groove 21 and can regulate the deflection of the flexible member 57, thereby surely preventing insertion of the engagement portion 11 into the engagement groove 21.

Figure 8:
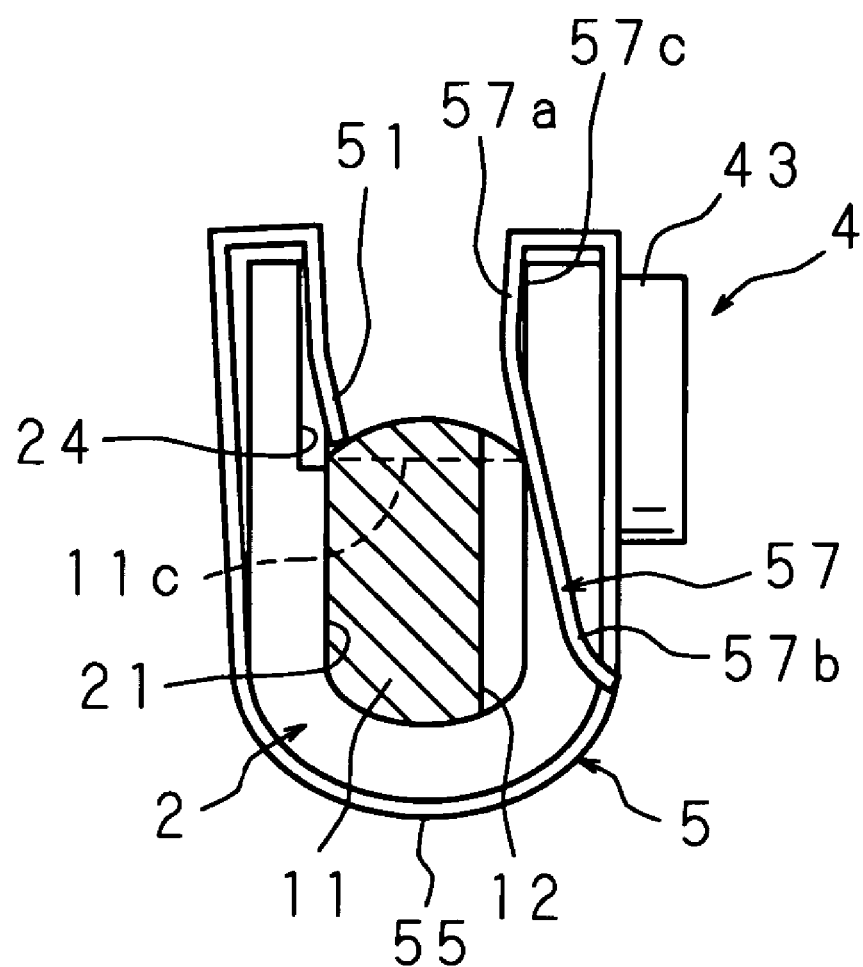
FIG. 8 is an explanatory view of canceling of the coupling of the shaft body and a shaft joint in the coupling structure of the present invention.

FIG. 8 is an explanatory view of canceling of the coupling of the shaft body and the shaft joint.

When canceling the coupling of the shaft body 1 and the shaft joint A for maintenance, inspection or the like, a finger or the like is put on the tip of the narrow portion 57b of the flexible member 57 to deflect the narrow portion 57b outwardly in the width direction of the engagement groove 21. Consequently, the narrow portion 57b is displaced to the outside of the engagement groove 21, and it becomes possible to cancel the engagement of the flexible member 57 with the positioning recess 12 and to pull out the engagement portion 11 in the axial direction of the engagement groove 21 without being hindered by the flexible member 57. At this time, since the deflection regulating portion 57c of the flexible member 57 is located in a position where it does not come into contact with the engagement portion 11, the shaft body 1 can be pulled out in the longitudinal direction of the engagement groove 21 without being hindered by the flexible member 57.

Note that although the above-explained embodiment illustrates the structure where the plate body 5 having the regulating tongues 51 is provided with the flexible member 57, it may be possible to couple the flexible member 57 to the joint portion 2 by coupling means, such as a set screw or welding, separately from the regulating tongues 51, and the structure of the flexible member 57 is not particularly limited.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A coupling structure, comprising:
a shaft body having a slip-off preventing groove and a positioning recess close to an end portion thereof;
a shaft joint having an engagement groove with which the shaft body is engaged and, bores facing the engagement groove;
a flexible member which projects in the depth direction of the engagement groove, extends externally from the engagement groove along a longitudinal direction of the engagement groove, and engages an engagement face in the positioning recess such that the flexible member regulates movement of the shaft body in the longitudinal direction of the engagement groove; and
a coupling shaft, which is inserted into the bores and the slip off preventing groove, for coupling the shaft body and the shaft joint, wherein:
the flexible member is configured to be deflected in a width direction of the engagement groove for engaging the engagement face,
the flexible member has a deflection regulating portion, the deflection regulating portion being substantially planar and including a planar surface facing a side face of the engagement groove,
a tip of the flexible member is bent outward in a width direction of the engagement groove, and
the tip of the flexible member extending externally from the engagement groove along a longitudinal direction of the engagement groove is accessible to be bent outward in order to deflect the flexible member and disengage the flexible member from the positioning recess.

2. The coupling structure according to claim 1, wherein the positioning recess of the shaft body and the flexible member are configured such that, when the flexible member has been disengaged from the positioning member and the shaft body has been withdrawn from the engagement groove, the flexible member is released and extends to prevent the shaft body from being reinserted into the engagement groove along the depth direction unless the flexible member is aligned with the positioning recess.

3. The coupling structure of claim 1, wherein the shaft body includes a top face adjacent the coupling shaft and a side face, the positioning recess being disposed in the side face of the shaft body.

* * * * *